United States Patent
Stucker

(10) Patent No.: US 12,489,269 B2
(45) Date of Patent: Dec. 2, 2025

(54) COMPOSITE FIBER LASER ASSEMBLY

(71) Applicant: Photo Prime Incorporated, Plainfield, IN (US)

(72) Inventor: David Stucker, Plainfield, IN (US)

(73) Assignee: Photon Prime Incorporated, Plainfield, IN (US)

( * ) Notice: Subject to any disclaimer, the term of this patent is extended or adjusted under 35 U.S.C. 154(b) by 257 days.

(21) Appl. No.: 18/526,059

(22) Filed: Dec. 1, 2023

(65) Prior Publication Data

US 2024/0106186 A1    Mar. 28, 2024

Related U.S. Application Data

(63) Continuation-in-part of application No. 17/206,675, filed on Mar. 19, 2021, now abandoned.

(60) Provisional application No. 62/993,797, filed on Mar. 24, 2020.

(51) Int. Cl.
    *H01S 3/1123*          (2023.01)

(52) U.S. Cl.
    CPC ......... *H01S 3/1123* (2023.01); *H01S 2302/00* (2013.01)

(58) Field of Classification Search
    CPC ..... H01S 5/40–4093; H01S 3/23–2391; H01S 3/1123–127; H01S 3/1106–1121; H01S 5/0615; H01S 5/0608; H01S 5/0657; H01S 5/4068; H01S 3/10038; H01S 3/10046; H01S 5/4012; G02B 6/02328

See application file for complete search history.

(56) References Cited

U.S. PATENT DOCUMENTS

| | | | |
|---|---|---|---|
| 1,006,927 | A | 10/1911 | Kliner |
| 4,573,465 | A | 3/1986 | Sugiyama |
| 5,139,494 | A | 8/1992 | Freiberg |
| 5,387,211 | A | 2/1995 | Saadatmanesh |
| 5,655,547 | A | 8/1997 | Karni |
| 5,688,264 | A | 11/1997 | Ren |
| 5,867,305 | A | 2/1999 | Waarts |
| 5,970,983 | A | 10/1999 | Karni |
| 6,091,749 | A | 7/2000 | Hoffmaster |
| 6,301,273 | B1 | 10/2001 | Sanders |

(Continued)

FOREIGN PATENT DOCUMENTS

| | | |
|---|---|---|
| CN | 105921884 | 9/2016 |
| DE | 102013114580 | 6/2015 |

(Continued)

*Primary Examiner* — Joshua King
(74) *Attorney, Agent, or Firm* — Brannon Sowers & Cracraft PC; David E. Novak

(57) ABSTRACT

A laser assembly, including a first CW laser having a first fiber optic cable operationally connected thereto for directing a first CW laser output, a second QCW laser having a second fiber optic cable operationally connected thereto for directing a second QCW laser output, and a third Q-switched laser having a third fiber optic cable operationally connected thereto for directing a third Q-switched laser output. A fusion point is operationally connected to the first, second, and third fiber optic cables for combining the first, second, and third laser outputs into a composite output. A fourth fiber optic cable is connected to and extends from the fusion point for directing the composite output.

19 Claims, 2 Drawing Sheets

(56) References Cited

U.S. PATENT DOCUMENTS

| | | |
|---|---|---|
| 6,324,195 B1 | 11/2001 | Suzuki |
| 6,838,639 B2 | 1/2005 | Kreuter |
| 6,856,634 B2 | 2/2005 | Mikame |
| 7,054,339 B1 | 5/2006 | Hu |
| 8,579,952 B2 | 11/2013 | Sun |
| 9,680,281 B2 | 6/2017 | Xuan |
| 9,696,568 B2 | 7/2017 | Sakuma |
| 10,003,168 B1 | 6/2018 | Villeneuve |
| 2002/0000426 A1 | 1/2002 | Mead |
| 2003/0031214 A1 | 2/2003 | Tanaka |
| 2003/0151053 A1 | 8/2003 | Sun |
| 2004/0133191 A1 | 7/2004 | Momiuchi |
| 2004/0258381 A1 | 12/2004 | Borrelli |
| 2006/0065640 A1 | 3/2006 | Lizotte |
| 2006/0153254 A1 | 7/2006 | Franjic |
| 2010/0118900 A1 | 5/2010 | Waarts |
| 2010/0228089 A1 | 9/2010 | Hoffman |
| 2010/0316072 A1 | 12/2010 | Deladurantaye |
| 2011/0216794 A1 | 9/2011 | Howard |
| 2011/0267671 A1 | 11/2011 | Peng |
| 2011/0284507 A1 | 11/2011 | Deladurantaye |
| 2012/0012762 A1 | 1/2012 | Nowak |
| 2012/0029604 A1* | 2/2012 | Sun ........................ A61B 18/22 607/89 |
| 2014/0050235 A1 | 2/2014 | Clowes |
| 2014/0133024 A1 | 5/2014 | Lippey |
| 2016/0367124 A1 | 12/2016 | Nishio |
| 2017/0164449 A1 | 6/2017 | Shimizu |
| 2019/0176264 A1 | 6/2019 | Kyoto |
| 2021/0305763 A1* | 9/2021 | Stucker ............... H01S 3/10038 |
| 2022/0075027 A1 | 3/2022 | Kahana |

FOREIGN PATENT DOCUMENTS

| | | |
|---|---|---|
| EP | 1979997 | 10/2008 |
| EP | 2676340 | 12/2013 |
| FR | 2798781 | 3/2001 |
| FR | 3081737 | 12/2019 |
| JP | 3211029 | 4/1996 |
| JP | 2007041342 | 2/2007 |
| JP | 6184084 | 8/2017 |
| WO | 9321843 | 11/1993 |
| WO | 03052890 | 6/2003 |
| WO | 2010083566 | 7/2010 |
| WO | 2015061411 | 4/2015 |
| WO | 2016025701 | 2/2016 |
| WO | 2014091551 | 1/2017 |
| WO | 2019002378 | 1/2019 |

* cited by examiner

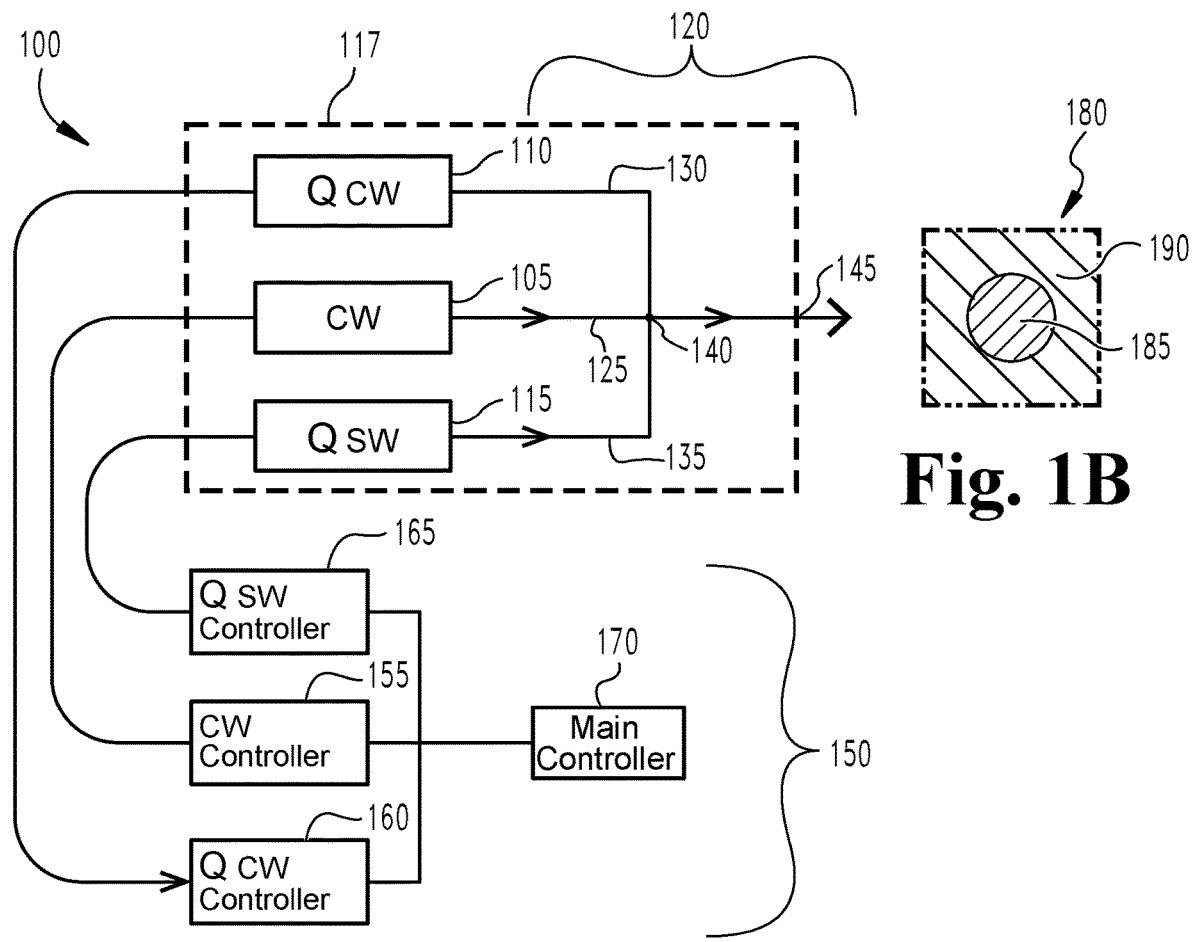
Fig. 1A
Fig. 1B
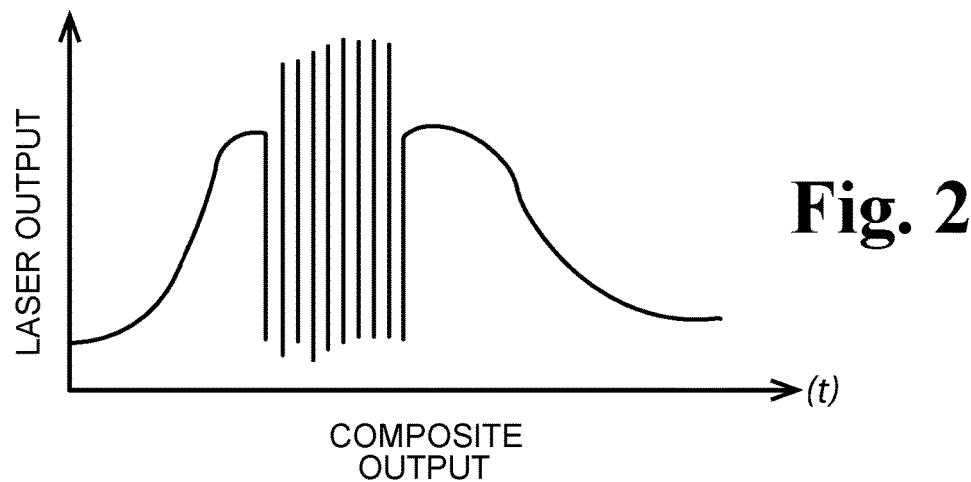
Fig. 2

COMPOSITE FIBER LASER ASSEMBLY

CROSS-REFERENCE TO RELATED APPLICATIONS

This application is a continuation-in-part of co-pending U.S. patent application Ser. No. 17/206,675, filed on Mar. 19, 2021, which claimed priority to U.S. provisional patent application Ser. No. 62/993,797, filed on Mar. 24, 2020, both of which are incorporated herein in their entirety by reference.

TECHNICAL FIELD

The present novel technology relates to the field of laser physics, and, more particularly, to a fiber optic laser assembly.

BACKGROUND

It has become increasingly useful in industrial and scientific applications to produce laser outputs that are complex and tailored to provide specific pulse profiles. These pulse profiles may have portions that resemble continuous waves (CW), quasi-CW (QCW), or pulsed profile, and other portions that resemble Q-switched high intensity short duration "delta function" pulses. Thus, a need persists for a more effective technique for generating custom laser output patterns. The present novel technology addresses this need.

BRIEF DESCRIPTION OF THE DRAWINGS

FIG. 1A is a schematic view of a fiber optic output laser assembly fusing the output of at least one respective continuous wave laser, quasi-continuous wave laser, and q-switched laser, according to the first embodiment of the present novel technology.

FIG. 1B is a cross-sectional view of a multicore fiber optic cable for directing the output of the assembly of FIG. 1A.

FIG. 2 is a schematic view of an example output pulse profile generated by the embodiment of FIG. 1A.

DESCRIPTION OF THE PREFERRED EMBODIMENTS

Figure 3:
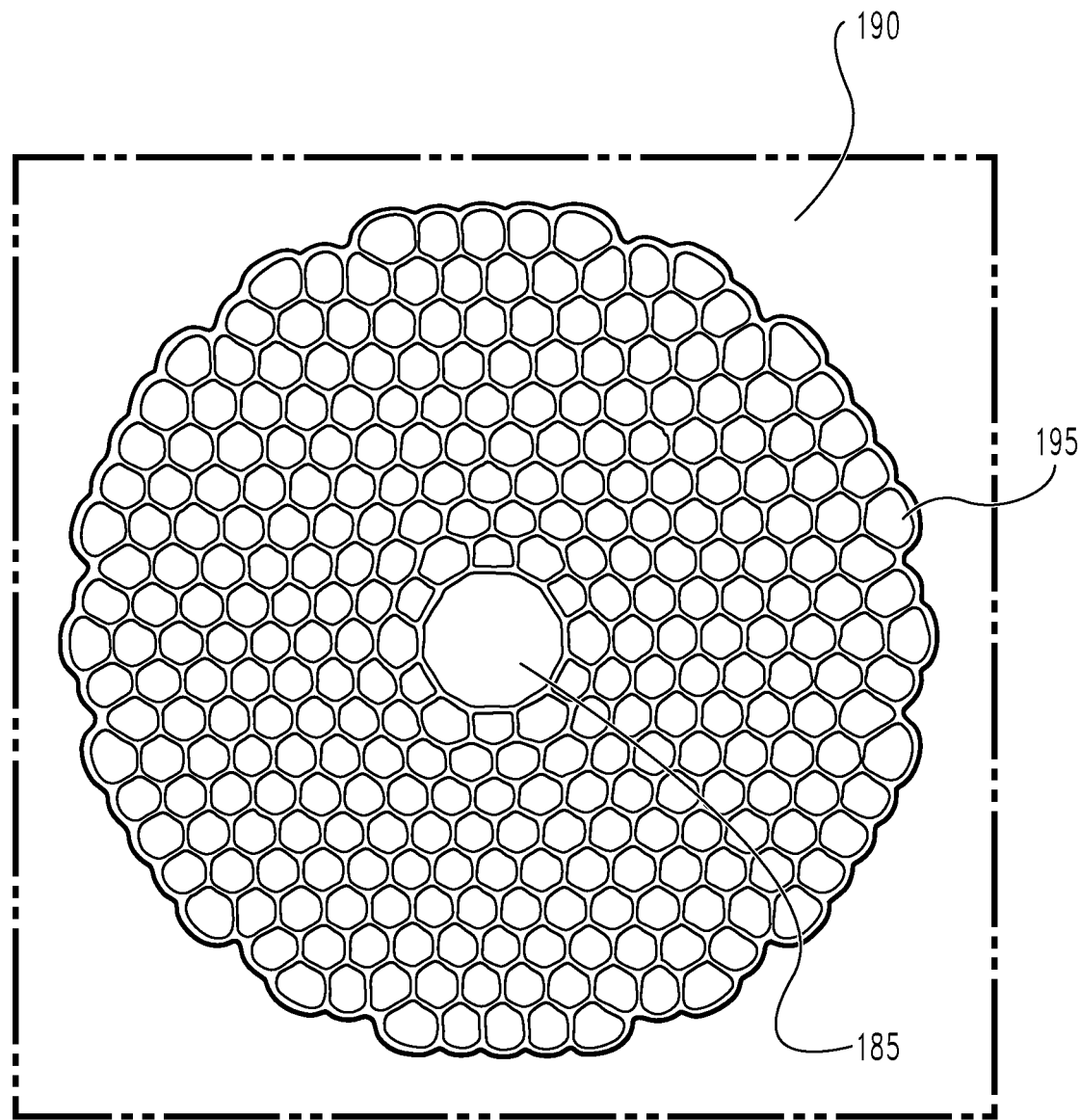
FIG. 3 is a cross-sectional view of a hollow core, or micro-structured, fiber multiple channel fiber optic cable for directing the output of the assembly of FIG. 1A.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

One embodiment of the novel technology as illustrated in FIGS. 1A-3 relates to a laser assembly 100 including at least one CW laser 105, at least one QCW laser 110, and at least one Q-switched laser 115, each respective laser 105, 110, 115 mounted in a housing and enjoying a fusion of their respective outputs via a fiber optic cable assembly 120. The laser sources 105, 110, 115 may be fiber optic lasers, or conventional lasers with a fiber delivery assembly. Each respective laser 105, 110, 115 includes an operationally connected fiber optic cable 125, 130, 135 for carrying and directing its output signal energy, and the respective cables 125, 130, 135 are joined at a fusion point 14o, beyond which extends a single output cable 145 for carrying and directing the energy of the fused signal.

Each respective at least one laser 105, 110, 115 is operationally connected to an electronic controller assembly 150 (typically a separate, physically spaced controller 155, 160, 165 for each respective laser 105, 110, 115; more typically the separate controllers 155, 160, 165 are connected in electric communication with one another; still more typically a master controller 170 is connected to the individual laser controllers 155, 160, 165; in some embodiments, a single controller 170 is connected to all respective lasers 105, 110, 115 for governing the firing of each respective laser to yield a combined or composite output pattern enjoying elements of the output characteristics of each respective laser 105, 110, 115.

As alluded to above, in some embodiments more than one of each type of laser 105, 110, 115 are operationally connected together to yield a composite signal, and in some cases, laser types may or may not be combined within the same illustrated laser, such as Q-SW/CW, Q-SW/QCW, and the like.

In some embodiments, the fiber optic assembly 120 is completely or partially made of a micro-structured, hollow core or holey fiber 180. The holey fiber 180 may have a single cylindrical hollow core 185 surrounded by a glass cladding 190, or may have multiple hollow tunnels 185 formed therethrough. The hollow core 185 is usually filled with air, but may be filled with an inert gas, such as nitrogen, or may even be partially evacuated. In some embodiments, the central core 185 is hollow and is surrounded by multiple glass fibers 195 in a cladding or matrix material 195. While glass fibers have a maximum energy throughput beyond which they become damaged or destroyed, the hollow core 185 has a higher maximum energy throughput. This effectively allows smaller cores to be utilized which translate to smaller spot sizes at laser focus.

As discussed above, this novel technology relates to a composite laser system and assembly that is comprised of a combination of QCW (quasi-continuous wave), CW (continuous wave), and Q-Switched lasers. The working parameters are typically a combination of each individual laser's characteristics, singularly or in any useful combination of the two or three above-listed laser types. Typically, the laser assembly source is operated with pulse frequencies ranging from 0 Hz (continuous wave) to kHz (QCW) and Q-Switched from 0.1 Hz to 400 kHz. The laser output power typically ranges from (singularly to combined) 0.1 W to 100 kW, more typically 1 W to 50 W, and may range substantially higher, but is typically operated in the 25 W to 10 kW range. The laser wavelength typically ranges from 1030 nm to 1070 nm with harmonics, more typically from 515 nm to 535 nm, still more typically from 300 nm to 400 nm. Pulse duration are as follows: for CW as in continuous wave there is by definition no pulse duration; for QCW, pulse duration is typically 100 microseconds to tens of milliseconds; for Q-Switched pulse duration typically ranges from 9 nanoseconds to 500 nanoseconds, more typically around 100 nanoseconds due to material interaction efficiency.

Laser sequencing may be simultaneous CW and QCW followed by a predetermined number of embedded Q-Switched pulses (with CW/QCW typically slightly leading the Q Switched pulses); QCW and Q-switched; CW and Q-Switched. Combinations of simultaneous pulse formats as in CW surrounding a QCW/Q-Switched core at focus may also be applied to the material being processed. In some cases, applying the Q-switched pulse format to the outer portion of the focus can be beneficial as a substitution to simply having the CW format surrounding the inner core format of the remaining converse laser beam formats. In any case, the format of the composite focus is made up of a suitable temporal combination that is advantageous to the material process under consideration—whether cutting, welding, additive manufacturing, or drilling is being performed (as specific examples). This technique can likely be applied to all suitable laser applications.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. A laser assembly, comprising:
   a first CW laser having a first fiber optic cable operationally connected thereto for directing a first CW laser output;
   a second QCW laser having a second fiber optic cable operationally connected thereto for directing a second QCW laser output;
   a third Q-switched laser having a third fiber optic cable operationally connected thereto for directing a third Q-switched laser output;
   a fusion point operationally connected to the first, second, and third fiber optic cables for combining the first, second, and third laser outputs into a composite output; and
   a fourth fiber optic cable connected to and extending from the fusion point for directing the composite output;
   wherein the laser assembly supplies QCW pulses in the frequency range from 0.1 to 5 kHz;
   wherein the laser assembly supplies Q-switched pulses in the frequency range from 0.1 to 400 kHz;
   wherein the laser assembly has a combined power output in the range from 0.1 W to 100 kW; and
   wherein the laser assembly supplies pulses having pulse durations of 100 microseconds to 50 milliseconds for QCW output signals and pulse durations of 9 nanoseconds to 500 nanoseconds for Q-switched signals.

2. The assembly of claim 1 and further comprising a housing within which the respective lasers are positioned.

3. The assembly of claim 1 and further comprising at least one electronic controller operationally connected to the respective lasers.

4. The assembly of claim 3 wherein the at least one electronic controller is a first electronic controller operationally connected to the first CW laser, a second electronic controller operationally connected to the second QCW laser, and a third electronic controller operationally connected to the third Q-switched laser.

5. The assembly of claim 3 wherein at least one master electronic controller is operationally connected to each individual laser controller.

6. The assembly of claim 1 wherein the fourth fiber optic cable has a hollow core.

7. The assembly of claim 6 wherein the hollow core is filled with inert gas.

8. The assembly of claim 6 wherein the hollow core is partially evacuated.

9. The assembly of claim 3 wherein the at least one electronic controller is configured to first simultaneously fire the first CW laser and the second QCW laser and then fire the Q-switched laser to yield a predetermined number of pulses.

10. The assembly of claim 1 wherein the combined output has a wavelength of between 1030 nm and 1070 nm.

11. The assembly of claim 1 wherein the combined output has a wavelength of between 515 nm and 535 nm.

12. The assembly of claim 1 wherein the combined output has a wavelength of between 300 nm and 400 nm.

13. A laser system, comprising:
   a laser assembly, having at least one laser for providing a CW signal, at least one laser for providing a QCW signal, and at least one laser for providing a Q-switched signal;
   a fiber optic cable assembly operationally connected to laser assembly, having a first optical fiber operationally connected to the at least one laser for providing a CW signal, a second optical fiber operationally connected to the at least one laser for providing a QCW signal, a third optical fiber operationally connected to the at least one laser for providing a Q-switched signal, a fusion point operationally connected to the first, second, and third optical fibers, and a fourth optical fiber operationally connected to the fusion point combines first, second, and third laser energy outputs into a composite energy output;
   wherein the laser assembly supplies QCW pulses in the frequency range from 0.1 to 5 kHz;
   wherein the laser assembly supplies Q-switched pulses in the frequency range from 0.1 to 400 kHz;
   wherein the laser assembly has a combined power output in the range from 0.1 W to 100 kW; and
   wherein the laser assembly supplies pulses having pulse durations of 100 microseconds to 50 milliseconds for QCW output signals and pulse durations of 9 nanoseconds to 500 nanoseconds for Q-switched signals.

14. The laser system of claim 13 and further comprising an electronic controller assembly operationally connected to the laser assembly.

15. The laser system of claim 14, wherein the electronic controller assembly includes a first electronic controller operationally connected to the at least one laser for providing a CW signal, a second electronic controller operationally connected to the at least one laser for providing a QCW signal, and a third electronic controller operationally connected to the at least one laser for providing a Q-switched signal.

16. The laser system of claim 14 wherein the first, second, and third electronic controllers are physically spaced from one another.

17. The assembly of claim 13 wherein the combined output has a wavelength of between 1030 nm and 1070 nm.

18. The assembly of claim 13 wherein the combined output has a wavelength of between 515 nm and 535 nm.

19. The assembly of claim 13 wherein the combined output has a wavelength of between 300 nm and 400 nm.

\* \* \* \* \*